United States Patent [19]

Katsuzawa et al.

[11] Patent Number: 5,043,616

[45] Date of Patent: Aug. 27, 1991

[54] INDUCTION MOTOR MOUNTED ON BOLTED LEGS AND END PLATES

[75] Inventors: Yukio Katsuzawa; Michi Masuya, both of Yamanashi, Japan

[73] Assignee: Fanuc Ltd., Yamanashi, Japan

[21] Appl. No.: 369,558

[22] PCT Filed: Oct. 14, 1988

[86] PCT No.: PCT/JP88/01047

§ 371 Date: Jun. 6, 1989

§ 102(e) Date: Jun. 6, 1989

[87] PCT Pub. No.: WO89/03605

PCT Pub. Date: Apr. 20, 1989

[30] Foreign Application Priority Data

Oct. 14, 1987 [JP] Japan .................. 62-257273

[51] Int. Cl.$^5$ .................................. H02K 5/04
[52] U.S. Cl. ........................... 310/91; 310/217
[58] Field of Search ............ 310/89, 90, 91, 217, 310/254, 258

[56] References Cited

U.S. PATENT DOCUMENTS

| 2,023,259 | 12/1935 | Anderson | 310/258 |
| 4,216,399 | 8/1980 | Bartheld | 310/91 |
| 4,636,673 | 1/1987 | McDonald | 310/91 |

FOREIGN PATENT DOCUMENTS

| 951583 | 10/1956 | Fed. Rep. of Germany | 310/89 |
| 29-12636 | 10/1954 | Japan . | |
| 30-6621 | 5/1955 | Japan . | |
| 32-12247 | 10/1958 | Japan . | |
| 48-13702 | 2/1973 | Japan . | |
| 52-68906 | 6/1977 | Japan . | |

Primary Examiner—William H. Beha, Jr.
Assistant Examiner—D. Rebsch
Attorney, Agent, or Firm—Armstron, Nikaido, Marmelstein, Kubovcik, & Murray

[57] ABSTRACT

A construction of an electric induction motor having a stacked stator core (10) arranged around the outer circumference of a rotatable rotor (12) via an annular air gap (14), front and rear housings (20 and 22) arranged at front and rear ends of the stator core (10) and supporting the rotatable rotor (121) via rotary bearings (24 and 26), and mounting legs (28) separate from the front and rear housings (20 and 22). The stacked stator core (10) is formed, at a periphery, with through-bores (32) permitting tie-bolts (30) to pass therethrough, to thereby combine the front and rear housings (20 and 22) and the stator core (10) together as one body. The separately formed mounting legs (28) are fixed to the front and rear housings (20 and 22) by bolts.

1 Claim, 2 Drawing Sheets

INDUCTION MOTOR MOUNTED ON BOLTED LEGS AND END PLATES

1. TECHNICAL FIELD

The present invention relates to a construction of a motor having mounting legs, and more particularly, to a construction of an induction type motor in which, an induction motor, a connection of core laminates of a stator core, as well as a connection of motor-mounting legs to a motor housing, are assembled by joining those elements together without welding, to thereby prevent generation of magnetic noise during the rotation of the motor.

2. BACKGROUND ART

Induction motors, especially variable speed induction motors driven via a transistor inverter, are used as rotary drive source for machine tools and other industrial machines, and in the known method of fabricating and assembling the induction motors, welding is often used for interconnecting core laminates of a stator core after stacking. Alternatively, in some conventional small output induction motors, the stacked core laminates are connected by a mechanical staking method. Nevertheless, the staking method for connecting core laminates is not applicable to intermediate output type motors because, in the intermediate or larger output type motors, the size of the stator core is larger, and therefore, the staking of the core laminates by using a press machine is difficult from the view point of the capability of the press machine. As a result, in induction motors of more than an intermediate output, a tungsten-inert gas welding or a metal-inert gas welding method is employed for connecting the core laminates.

Moreover, many induction type motors are used which have a construction such that mounting legs for fixing the induction motor to a driven unit such as a machine tool are separately manufactured and attached to the outer periphery of the body of the motor. In this case, the mounting legs are often connected to front and rear housings or around the stator core of a non-shell type induction motor by welding. When the welding connection is incorporated in the construction of a motor, however, the welded portions are subjected to intense heat, and a weld bead is applied to the to-be-welded portions under a high temperature. As a result, shrinkage of the welded portions and the weld bead occurs during cooling of the welded portions, and consequently, often the bore of a stator core in which a rotor element of the motor is inserted and arranged via a small gap is deformed, causing a deterioration in the roundness and axial straightness of the bore. Accordingly, the gap between the outer periphery of the rotor element and the inner face of the bore of the stator core is not even, and this uneven gap between the rotor periphery and the stator bore causes an uneven distribution of the density of magnetic flux when an electric excitation current is supplied to the stator element, which results in a generation of magnetic noise when the motor is rotated. Particularly, in the case of variable speed induction type motors driven via a transistor inverter, the frequency of the magnetic noise is as high as more than 1 kHz during high speed rotation of the motor, resulting in a generation of sharp metallic sounds, and therefore, a problem of noise pollution arises. Accordingly, to prevent the generation of magnetic noise in such motors, an improvement in the fabrication and assembly of the motors, particularly an improvement in the design of the construction of stators, is required so that a deformation of the stator cores does not occur during the fabricating and assembly of the stator cores.

DISCLOSURE OF THE INVENTION

Therefore, an object of the present invention is to provide a construction of an electric motor which is able to satisfy the above-mentioned requirement.

Another object of the present invention is to provide an electric motor having mounting legs that are not welded to the motor.

A further object of the present invention is to provide a construction of an electric induction motor assembled by employing only a connection by threaded screws and tie-bolts.

To realize the above objects of the present invention, there is provided an electric motor having a rotatable rotor, a stator core having stacked corelaminates and arranged around the rotor via an annular air-gap, front and rear housings disposed at front and rear ends of the stator core, respectively, rotary bearings for supporting the rotor, and mounting legs formed separately from the front and rear housings, characterized in that the stator core has, at the periphery thereof, a plurality of bores in which screw bolts are inserted to thereby combine the front and rear housings and the stator core as one body, and that the above-mentioned separately formed mounting legs are threadingly and fixedly connected to the above front and rear housings.

BRIEF DESCRIPTION OF THE DRAWINGS

The above and other objects, features, and advantages of the present invention will be made apparent from the ensuing description of an embodiment with reference to the accompanying drawings wherein.

BEST MODE OF CARRYING OUT THE INVENTION

Figure 1:
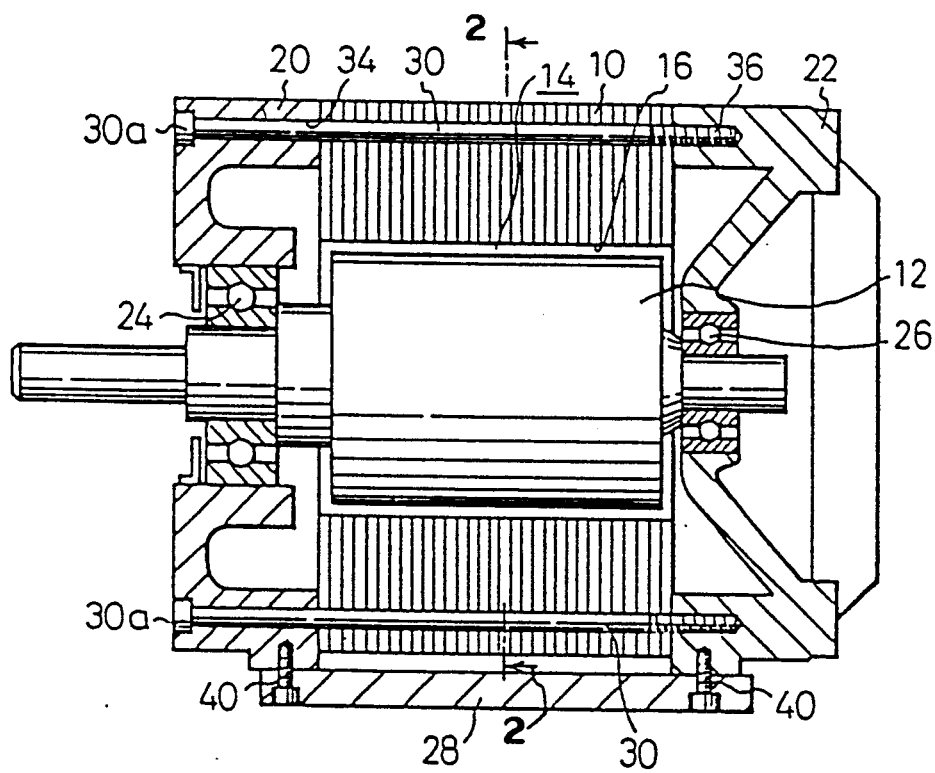
FIG. 1 is a longitudinal cross-sectional view of an electric motor to which mounting legs are connected in a non-welded manner.
Figure 2:
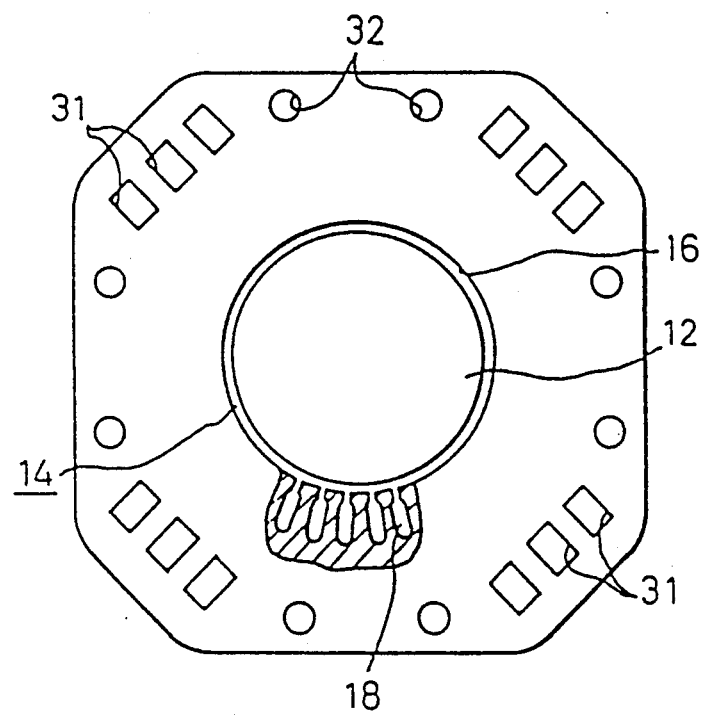
FIG. 2 is a cross-sectional view taken along the line 2—2 of FIG. 1.
Figure 3:
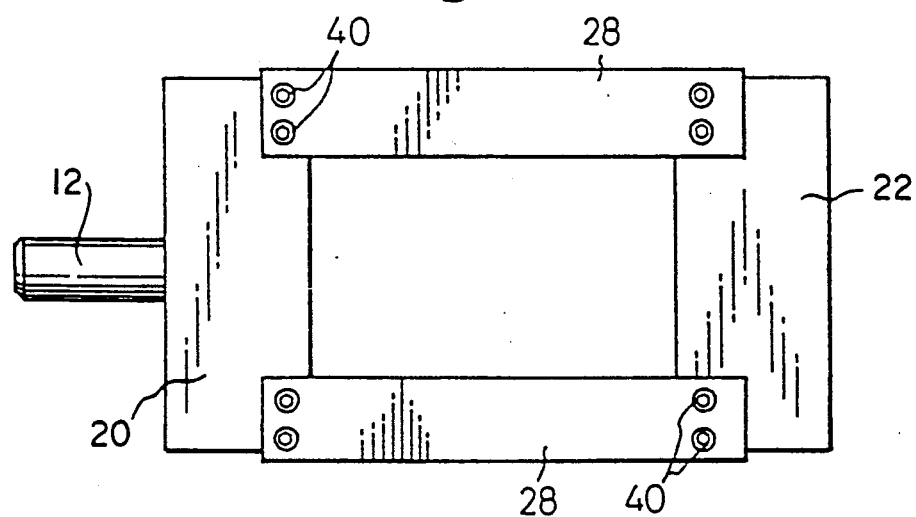
FIG. 3 is a bottom view of the motor of FIG. 1.

Referring to FIGS. 1 through 3, an electric motor according to an embodiment of the present invention includes a stator core 10 formed by stacking a plurality of core laminates, each stamped by a press machine from a silicon steel plate by a conventional stamping method, and a rotor 12. The stator core made of stacked core laminates has an inner bore 16 in which the rotor 12 is arranged to confront the bore face via an air gap 14, and slots 18 (FIG. 2) extending radially outwardly from the bore face and accommodating excitation windings (not shown), and front and rear housings 20 and 22 are disposed at front and rear ends of the stator 10. The front and rear housings 20 and 22 include rotary bearings 24 and 26 mounted on a central portion of the front and rear housings, respectively, to rotatively support the rotor 12, and mounting legs 28 are fixed to the front and rear housings 20 and 22 as described later.

Tie-bolts 30 having a screw thread formed at one end thereof are provided for joining the stacked core laminates of the stator core 10 together and for connecting the front and rear housings to the front and rear ends of the stator core 10, to thereby obtain non-welded connections when assembling the stator core 10. The tie-bolts 30 are uniformly arranged and distributed in the peripheral portion of the stator core 10, and pass through a plurality of axial through-bores 32 of the stator core 10 and bolt-holes 34 and 36 formed in the front and rear housings 20 and 22 to be in alignment with the through-bores 32 of the stator core 10. In the illustrated embodiment, the bolt-holes 36 of the rear housing 22 are formed in threaded blind bores which can be threadingly engaged with the threaded ends of the tie-bolts 30, to tightly secure the front and rear housings 20 and 22 and the stator core 10 as one body. The other end of each tie-bolt 30 is formed with a head 30a which is seated in a counter-bore of the front housing 20 and thus does not project from the end face of the front housing 20.

Preferably, the through-bores 32 of the stator core 10 are arranged in four regions equidistantly arranged around the center of the motor, so that uneven axial forces that may cause a deterioration in the roundness of the inner bore 16 of the stator core 10, as well as an axial straightness of the inner bore 16, are not applied by the tie-bolts 30 to the stator core 10 when the tie-bolts 30 are tightened. The through-bores 32 of the stator core 10 are formed by stamping at the same time as the stamping of each stator core laminate from the material plate, and the size of each through-bore 32 is formed and controlled to provide a clearance not larger than a predetermined value between the bore 32 per se and the corresponding outer diameter of each tie-bolt 30, to thereby maintain a high accuracy in the stacking of the core laminates of the stator core 10. Moreover, the number of the tie-bolts 30 and the through-bores 32 of the stator core 10 are selected to be optimum for obtaining an appropriate tightening and connecting force comparable with the force obtained from the conventional welding connection.

When the mounting legs 28, 28 are fixed to the front and rear housings 20 and 22, a connection by a threaded engagement is adopted instead of the conventional welding connection, according to an embodiment of the present invention. In the illustrated embodiment, the mounting legs 28, 28 are preliminarily formed separately from the front and rear housings 20 and 22, to be used as axially longitudinal legs of a motor. The mounting legs 28, 28 are rigidly fixed to the front and rear housings 20 and 22 by using fixing bolts 40, respectively. In an alternative embodiment, when four individual legs instead of the above-mentioned longitudinal legs are attached to four corners of the motor, each leg may be preliminarily formed with male screw threads, and threadedly engaged with female screw holes formed in the front and rear housings 20 and 22 at positions thereof where the respective legs are to be attached. Preferably, an appropriate adhesive may be applied to the engaged portions of the male screws and the female screw holes, to prevent loosening of the mounting legs 28, 28 due to vibration occurring during use of the electric motor.

In accordance with the adoption of the above-mentioned non-welded connection, when the core laminates of the stator core 10 are stacked during the assembly of the motor, thermal deformation can be completely avoided, and therefore, the roundness and axial straightness of the inner bore 16 of the stator core 10 can be maintained at a high level of accuracy.

Moreover, when a plurality of the core laminates are stacked together, a stacking jig is generally inserted into the inner bore 16 of the stacked core laminates to thereby accurately bring all of the core laminates into alignment with one another. Then, since the stator core laminates are combined together by the above-mentioned non-welded connection, which does not cause deformation such as generated in the conventional welded connection during the process of cooling, it is possible to set a minimum clearance between the stacking jig and the inner bore 16 of the stator core, and therefore, strict control of a small tolerance of the inner bore 16 can be implemented, and thus a very precise air gap 14 can be formed between the outer diameter of the rotor 12 and the inner bore 16 of the stator core. Accordingly, the performance of the electric motor is enhanced.

Further, the fixing of the mounting legs 28, 28 to the front and rear housings by screw bolts contributes to a prevention of thermal deformation of the stator core 10. This also prevents thermal deformation of the legs 28, 28 from, and therefore, it is not necessary to flatten the bottoms of the fixed legs 28, 28 by machining after the fixing process thereof.

In FIG. 2, rectangular holes 31 formed in the stator core 10 are provided as coolant passageways for permitting a coolant such as a cooling air to pass therethrough, to thereby remove heat generated when the motor is operated by the supply of an electric excitation current.

Although the foregoing description was made with reference to the preferred embodiment of the present invention, and the present invention provides a construction of an electric induction motor which employs a screw engagement connection and does not employ a welded connection, it should be understood that the arrangement and number of the through-holes for tie-bolts are not limited to the illustrated embodiment.

From the foregoing description, it will be understood that, according to the present invention, when fabricating and assembling a motor, especially an electric induction motor with mounting legs, a combined motor construction having no welded connections can be obtained. Therefore, it is possible to provide a very accurately sized inner bore of the stator core without deformation of the roundness and axial straightness of the inner bore, during the assembly of a stator core. Consequently, an even annular air gap can be formed between the outer diameter of the rotor and the inner bore of the stator of the induction motor, to thereby ensure the formation of a uniform distribution of the magnetic density in the air gap. This makes it possible to reduce a level of magnetic noise, especially a metallic noise generated during a high speed rotation of the motor. Further, since the connecting and combining force are strong, a mechanical strength of the construction of a motor is strong, and accordingly, the performance and rigidity of the electric induction motor are increased.

We claim:

1. An electric induction motor having mounting legs connected thereto without welding, and including a rotatable rotor, a stacked stator core arranged around the rotor with an annular air gap, a pair of front and rear housings arranged at front and rear ends of the stator core and supporting the rotor via rotary bearings, and mounting legs constructed separately from the front and rear housings, characterized in that said stacked stator core is formed, at a periphery thereof, with a plurality of through-bores permitting tie-bolts to pass therethrough to thereby combine said front and rear housings and said stator core together as one body, an equal number of said through bores and said tie-bolts are arranged at four regions equally spaced around a center of said electric induction motor, and that said separately formed mounting legs comprise a pair of juxtaposed leg members fixed to said front and rear housings by threaded bolts.

* * * * *